Figure 1:
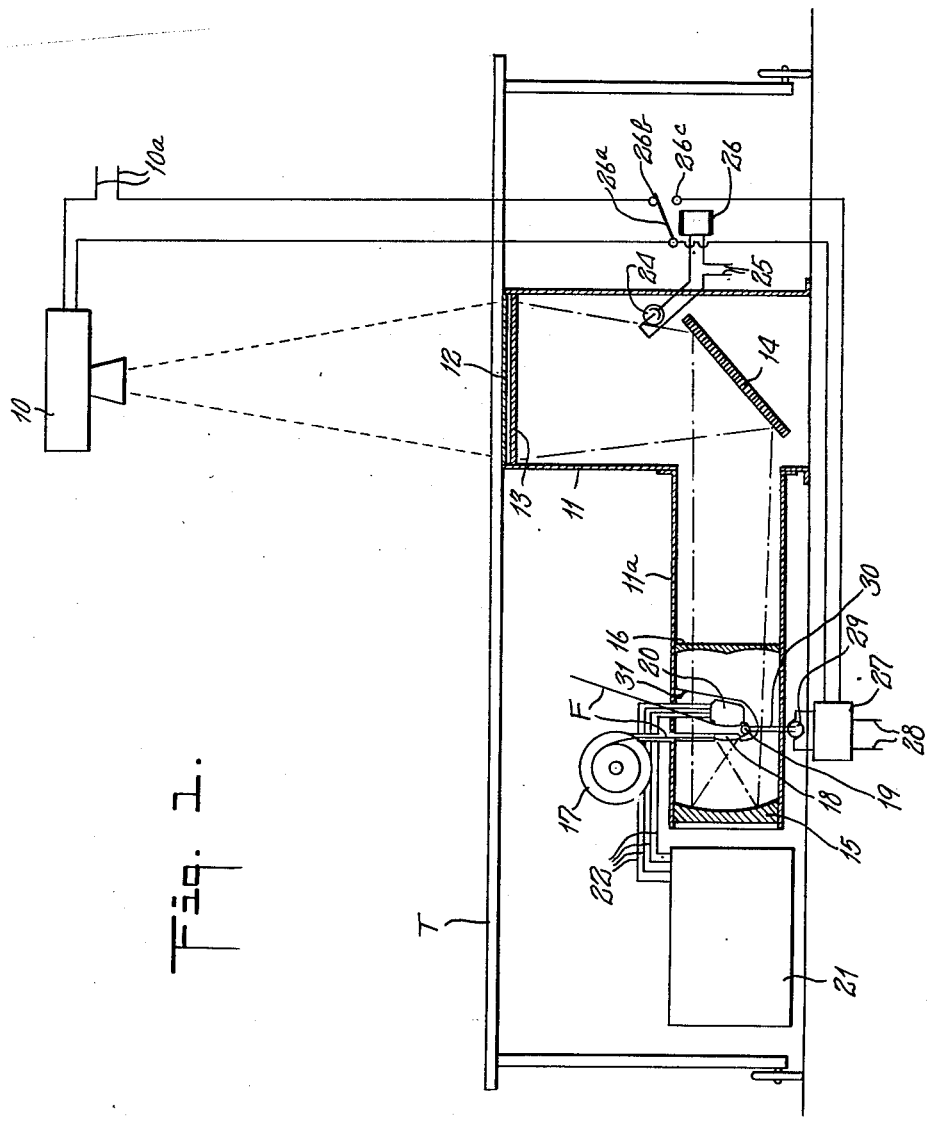

May 6, 1952  C. M. TUTTLE ET AL  2,595,430
PHOTOFLUOROGRAPHIC APPARATUS
Filed April 8, 1950  2 SHEETS—SHEET 1

INVENTORS
CLIFTON M. TUTTLE
BY RUSSELL H. MORGAN
Davis, Hoxie & Faithfull
ATTORNEYS

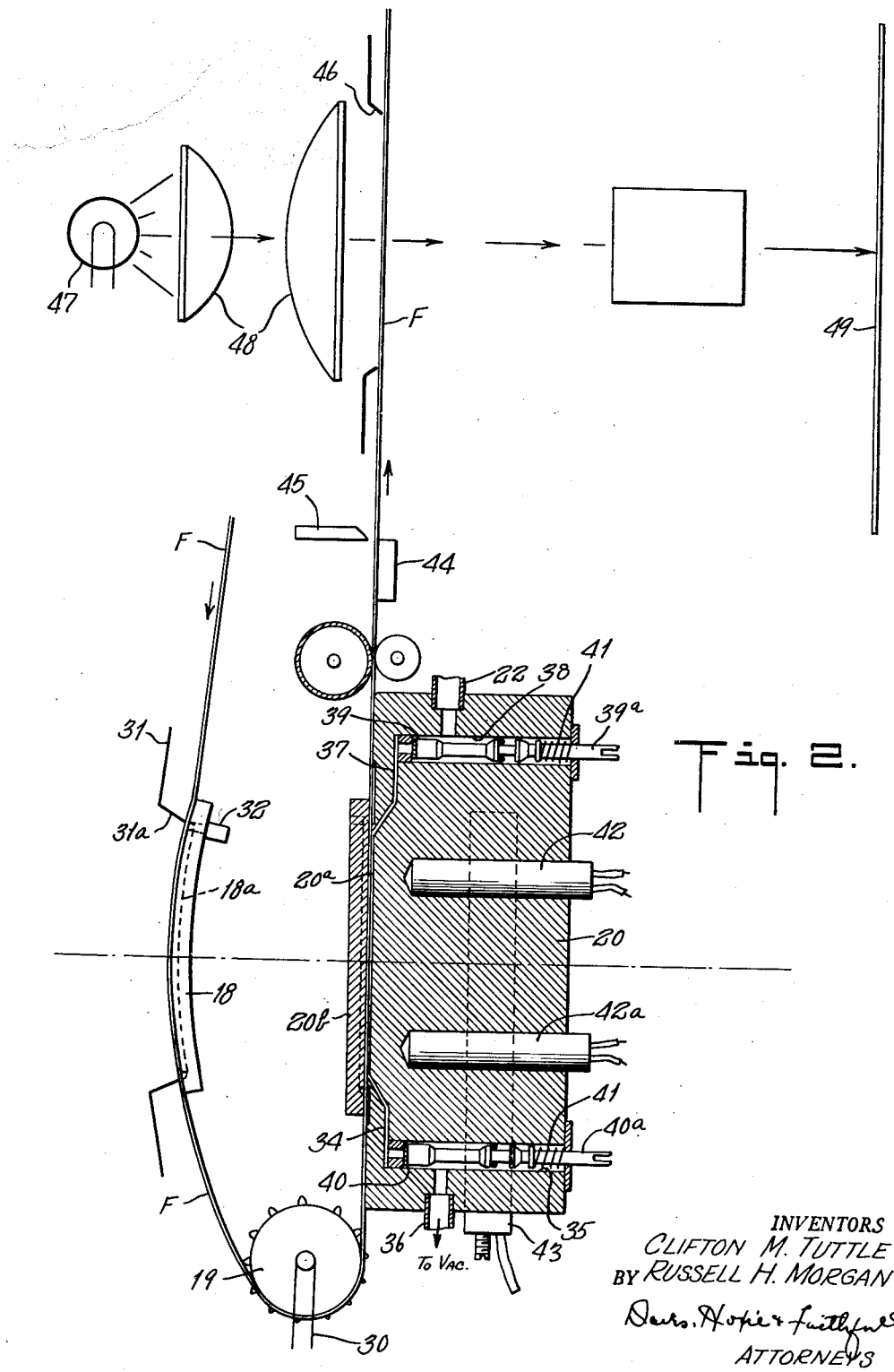

Patented May 6, 1952

2,595,430

UNITED STATES PATENT OFFICE 2,595,430

PHOTOFLUOROGRAPHIC APPARATUS

Clifton M. Tuttle, Halesite, N. Y., and Russell H. Morgan, Baltimore, Md.; said Tuttle assignor to Kenyon Instrument Company, Inc., Huntington, N. Y.

Application April 8, 1950, Serial No. 154,794

9 Claims. (Cl. 250—65)

This invention relates to photofluorography and more particularly to an improved apparatus for quickly and permanently recording a shadowgraph produced by Roentgen or X-rays.

Roentgen rays have the well-known ability to penetrate such bodies as metal castings, mechanical parts and anatomical structures. The amount of radiation transmitted by these structures is governed in part by their thickness, density and atomic composition. Consequently, when a Roentgen ray beam is transmitted by a body of varying thickness, density or atomic composition, it presents an image of the internal structure of the body. Since Roentgen rays are invisible, it is necessary to interpose in the transmitted beam some mechanism by which the Roentgen-ray image is converted into a visible image, if the intelligence of the image is to be comprehended by an observer. This mechanism may be a photographic film or plate or a screen coated with a crystalline material which fluoresces under the influence of Roentgen rays.

The Roentgen-ray image of a structure undergoing examination is a shadowgraph of essentially the same projected area as the structure itself, since Roentgen rays can be refracted only with great difficulty. Therefore, in the case of the photographic receptor, large film sizes are needed for the examination of large parts, whereby the procedure becomes prohibitively expensive in many instances. This difficulty may be overcome by utilizing the refractive properties of visible light in a receptor system employing a fluorescent screen on which the Roentgen-ray shadowgraph is produced, an optical system and a photographic film of reduced size. Although this procedure is relatively inexpensive, the time lag between the exposure of the photographic film and the development and viewing of it by an observer is always inconvenient and frequently prohibitive when conventional photographic processing is employed. While procedures for rapid development of photographic film have been proposed and used to some extent heretofore, they have not found use in X-ray photography due to the difficulties in adapting them to the special requirements involved in X-ray techniques.

The problem of time lag is overcome when the observer views the fluorescent screen directly. However, the brightness of these images is for many specimens, particularly those of considerable thickness, below the level required for good visual acuity even for the dark-adapted eye. The screen brightness level can be raised by increasing the Roentgen-ray intensity, but this is generally recognized as harmful to body tissue, a factor important to the examined subject in the case of medical examination and, in any case, important to the human observer of the screen. Electronic devices have been proposed for brightening the fluorescent screen without increasing the intensity of the Roentgen radiation. These devices may provide some improvement in the clarity with which the images are produced on fluorescent screens, but because of limitations in the number of Roentgen ray photons which may be used without harming the person being examined, the clarity will be poorer in more instances than that provided in photographic receptor systems (Limitations of Screen Intensification Systems, Strum and Morgan, American Journal of Roentgenology and Radium Therapy, vol. 62, 1949).

Receptor systems utilizing fluorescent screens, with or without image brightening, are also deficient for many purposes in that they do not yield a permanent record of the Roentgen examination. This is particularly disadvantageous in medical examinations where a comparison of the image patterns produced from time to time during an illness are highly desirable.

The present invention has for its principal object the provision of an apparatus which overcomes these difficulties previously encountered in photofluography.

The apparatus of the invention utilizes the actinic radiation of a Roentgen-ray excited screen, which may be of large size (for instance, 12" x 16"), and the resulting shadowgraph on the screen is reduced in size by a high quality, high aperture reflective-refractive optical system of the Kelner-Schmidt type and focused upon a section of a band of photosensitive film, such as a properly sensitized 70 mm. film. The latent image so formed is transferred immediately to a film processing head within the apparatus, where the image is developed and fixed and preferably washed and dried. This photographic processing of the exposed film within the apparatus is effected rapidly and automatically by maintaining the chemical processing fluids at a high temperature which is closely controlled and also by imparting a high velocity to the processing fluids in contact with the emulsion surface of the film so as to insure that chemical by-products of the reaction are removed from the film. Apparatus for obtaining this temperature control and high velocity of the processing fluids is disclosed in a copending application of Clifton M. Tuttle and Fordyce Brown, Serial No. 114,701, filed September 9, 1949. After completion of the film processing, the image is advanced to another position where it is either cut from the film band and delivered to the operator or introduced into an optical projection system which produces an enlarged image upon a screen, where it is viewed by the observer.

In the preferred form of the apparatus, the brightness of the screen is monitored by a photoelectric device which controls the duration of the X-ray exposure in accordance with the effective X-ray density of the specimen and insures that the product of time and intensity of exposure is a constant value. The photoelectric device may be arranged to operate a relay so as to deenergize the X-ray tube and simultaneously operate a conveyor for moving the film from its exposure station to the processing head. If desired, the extent of the film processing to develop and fix the image, etc., may be controlled photoelectrically as disclosed in a copending application Serial No. 35,493, filed June 26, 1948, to insure consistency of results. Such photoelectric control during development and fixation of the image insures uniform photographic images regardless of chemical concentration and other variable factors.

For a better understanding of the invention reference may be had to the accompanying drawings, in which Fig. 1 is a schematic view, partly in section, of a preferred form of the new apparatus, and Fig. 2 is an enlarged sectional view of the processing head of Fig. 1, and showing schematically the optical system for projecting the image on a screen.

The apparatus as illustrated comprises an X-ray source or Roentgen tube 10 mounted above an opaque housing having a vertical section 11 and a horizontal section 11a, each section being of generally cylindrical form. At the upper end of the vertical housing section 11 is a lead grid 12 of conventional type which is interposed between the tube 10 and a cylindrically curved fluorescent screen 13. A movable table T is provided for the person undergoing examination, and the part to be examined will rest on the table directly above the grid 12 and below the Roentgen tube so that a shadowgraph of the part will be produced on the fluorescent screen 13 by the action of the Roentgen rays. Within the vertical section 11, near its junction with the horizontal section 11a, is a plane front-surfaced mirror 14 for reflecting the shadowgraph from the screen 13 along the horizontal section 11a. A concave reflector 15 is mounted in the outer end of the horizontal section 11a to receive the image reflected by the mirror 14. Between the plane mirror 14 and the concave reflector 15 is an asperical lens 16 corresponding to a corrector lens of a Kelner-Schmidt optical system, of which the plane mirror 14 and concave reflector 15 are also parts.

A film supply retort 17 is mounted outside the opaque housing and is adapted to supply a band or strip of photographic film F to an exposure station 18 within the horizontal section 11a. The exposure station 18 is located between the corrector lens 16 and the concave reflector 15 and at the focal region of the latter. The unexposed film is drawn into the housing with its emulsion side facing the concave reflector 15, by means of a conveyor including a pull-down sprocket 19. The exposure station 18, which will be described in greater detail presently, is located on the axis of the reflector 15 and has a cylindrical or curved section which, during the exposure, holds the emulsion side of the film in a convex form facing the concave reflector 15. From the exposure station 18, the film is fed by the conveyor to a processing head 20 disposed between the film path and the corrector lens 16. Since the film strip is turned back upon itself in passing around the pull-down sprocket 19, the latter serves to turn the emulsion side of the film toward the corrector lens 16 as the film passes from the focal region of the concave reflector 15 to the processing head 20. The head 20 is supplied with processing fluids, such as developer, fixer and washing solution, in sequence, from a tank 21 through pipe lines 22 leading into the horizontal housing section 11a.

The duration of the X-ray exposure is controlled by a photoelectric cell 24 positioned in the vertical housing section 11 where it is influenced by the intensity of the light from the fluorescent screen 13. The cell 24 is in circuit with a current source 25 and a relay 26. When the light intensity of the screen 13 attains a predetermined value, the cell 24 actuates the relay 26 so as to disengage the armature switch 26a from contact 26b. Thereupon, the Roentgen tube 10, which is energized from a current source 10a, is deenergized. The armature switch 26a then engages a contact 26c to start an electric timer 27 energized from a current source 28, whereupon an electric motor 29 is operated through the timer and drives the pull-down sprocket 19 through a belt or other connection 30. Thereafter, the motor 29, under control of timer 27, stops the film feed when the latent image of the shadowgraph which previously appeared on the screen 13 reaches the processing head 20, and then resumes the film feed after the image has been processed, until the developed image reaches the next station. When another section of the film is to be exposed, the switch 26a is returned manually into engagement with contact 26b.

The horizontal housing section 11a contains a narrow casing 31 for shielding the film F against light radiation, except at the exposure station 18 where the casing has an aperture 31a (Fig. 2). The film is drawn by the sprocket 19 into aperture 31a where the emulsion side of the film faces the concave reflector 15 at the focal region of the latter. In other words, the reflector 15 images the fluorescent screen 13 upon the emulsion surface of the film at the exposure station 18. In order to counteract the optical effect of the cylindrical curvature of the screen 13, the exposure station 18 is formed by a member having a corresponding curvature of cylindrical section against which the rear or base surface of the film is held during the exposure. As shown in Fig. 2, the member 18 is curved so as to hold the film with its emulsion side in convex form and facing the reflector 15. The rear face of the film is held against the curved member 18 by suction applied through a vacuum line 32 to a recess 18a in the face of the member 18. The suction line 32 may be provided with an automatically actuated valve (not shown) for releasing the suction each time the sprocket 19 is driven to advance the film.

The processing head 20, as shown in Fig. 2, has a shallow recess 20a opposite a platen 20b, the film passing between the latter and the recess 20a. A passage 34 in the head 20 connects the recess 20a along one edge with a bore 35 leading to a vacuum line 36. Along its opposite edge, the recess 20a is connected by a passage 37 to another bore 38 which communicates with the supply pipe 22 for one of the processing fluids. The flow of fluid through the supply passage 37 to the recess 20a and the adjacent exposed film is controlled by a valve 39 in the bore 38, and the fluid discharge from recess 20a is controlled by a valve 40 in the bore 35. The valves are normally held closed by springs 41 and are adapted to be opened in any suitable manner, as by means of solenoids (not shown) connected to the valve stems 39a and 40a, respectively, and operable under control of the timer 27 or under photoelectric control as disclosed in a copending application Serial No. 35,493.

When the exposed film reaches the head 20, the film movement is interrupted so that the latent image on the emulsion side of the film overlies the recess 20a. Then the valves 39 and 40 are opened so that the suction from the vacuum line 36 draws the film tightly against the edges of recess 20a and also draws the developer fluid from supply pipe 22 into the recess, where it flows quickly from the upper edge to the lower edge in a thin stream against the emulsion surface of the film, the fluid finally discharging to waste through the vacuum line 36. In this way, the chemical reaction products are continuously and quickly removed from the film to expedite the processing. It will be understood that when the developing is completed the valve 39 is closed and a fixer solution is introduced to passage 37 from another of the supply pipes 22 through a valved bore similar to the bore 38. The washing fluids and, if desired, the drying fluid are similarly introduced in sequence through additional bores leading to the recess 20a through passage 37. The various fluid supply valves are actuated in sequence, preferably through solenoids operated from the timer 27 or controlled photoelectrically, as previously described.

The processing of the film in the head 20 is further expedited by electric heating elements 42 and 42a inserted in the head. These heating elements serve to maintain the head and therefore the processing fluids at an elevated temperature, and the temperature is closely controlled by a thermostat 43 inserted in the head and connected in circuit with the heating elements.

Upon completion of the film processing at the head 20, the film is drawn by another conveyor sprocket (not shown) to a drier 44 outside the housing 11—11a, if the drying has not been completed in the head 20. The part of the film bearing the processed image may then be removed from the film strip by a chopper 45 and delivered to the operator. Alternatively, the film strip bearing the processed image is drawn to an aperture 46 forming a projection station where light from a lamp 47, after passing through a lens system 48, passes through the film so as to project an enlarged image of the shadowgraph on the screen 49.

We claim:

1. A photofluorographic X-ray apparatus comprising a Roentgen tube, a fluorescent screen positioned to receive Roentgen rays from the tube to form a shadowgraph of an object in the path of said rays, a concave reflector having an optical axis, means for directing an image of the shadowgraph along said axis upon the concave reflector, said means including an aspherical corrector lens between the screen and the reflector and through which the image is directed from the screen, a film exposure station on said axis at the focal region of the concave reflector, a conveyor for feeding a photofluorographic film to the exposure station to form a latent image of the shadowgraph on the film, the conveyor including a member engageable with the film to pass the film in a path around said member from the station to a position on said axis located between the station and lens, a film processing head disposed at said position and having an open recess facing said path, said recess being positioned to be closed by a film moving along said path, and means for delivering a processing fluid to said head and recess for developing the image on the film.

2. Apparatus according to claim 1, comprising also a curved member adjacent the film path at said exposure station and operable to hold the film with its emulsion side convex and facing the reflector, and means for creating a suction in said curved member to draw the film against the curved member.

3. Apparatus according to claim 1, comprising also a heating element in the head for heating the film.

4. Apparatus according to claim 1, comprising also a device for deenergizing the Roentgen tube, and means under control of said device for operating the conveyor.

5. Apparatus according to claim 1, comprising also a photoelectric device responsive to a predetermined intensity of light on the fluorescent screen for deenergizing said tube, and means under control of said device for operating the conveyor.

6. Apparatus according to claim 1, in which the screen has a cylindrically curved face, and comprising also a member adjacent the film path at the exposure station and having a cylindrically curved face corresponding to the curvature of said first face and operable to hold the film with its emulsion side convex and facing the reflector.

7. Apparatus according to claim 1, in which said conveyor member is arranged to turn the emulsion side of the film toward the lens and said recess as the film passes from said focal region to the processing head.

8. Apparatus according to claim 1, comprising also a light source and a viewer screen between which the film is moved from the processing head by the conveyor.

9. A photofluorographic X-ray apparatus comprising a Roentgen tube, a fluorescent screen positioned to receive Roentgen rays from the tube to form a shadowgraph of an object in the path of said rays, a conveyor for feeding a strip of film along a path in which the film is exposed to the shadowgraph on the screen to form a latent image of the shadowgraph on the film, a film processing head disposed adjacent said path but beyond the point at which the film is exposed to the screen, means for delivering a fluid to said head for developing the image on the film, a device for deenergizing the Roentgen tube, and means under control of said device for operating the conveyor.

CLIFTON M. TUTTLE.
RUSSELL H. MORGAN.

(References on following page)

REFERENCES CITED

The following references are of record in the file of this patent:

UNITED STATES PATENTS

| Number | Name | Date |
|---|---|---|
| 1,879,498 | Richards et al. | Sept. 27, 1932 |
| 1,923,108 | Mehl et al. | Aug. 22, 1933 |
| 2,344,043 | Kallmann et al. | Mar. 14, 1944 |
| 2,371,843 | Powers | Mar. 20, 1945 |
| 2,419,478 | Bouwers | Apr. 22, 1947 |

OTHER REFERENCES

The Automatic Control of Exposure in Photofluorography by R. H. Morgan, Public Health Reports, October 15, 1943, pgs. 1533–1541.